United States Patent
Leiber et al.

(10) Patent No.: US 10,940,840 B2
(45) Date of Patent: Mar. 9, 2021

(54) ACTUATING SYSTEM FOR A VEHICLE BRAKE AND METHOD OF OPERATING THE ACTUATING SYSTEM

(71) Applicant: IPGATE AG, Pfäffikon SZ (CH)

(72) Inventors: Heinz Leiber, Oberriexingen (DE); Valentin Unterfrauner, Munich (DE); Christian Köglsperger, Geretsried (DE); Anton Van Zanten, Ditzingen (DE)

(73) Assignee: IPGATE AG, Pfaffikon (CH)

( * ) Notice: Subject to any disclaimer, the term of this patent is extended or adjusted under 35 U.S.C. 154(b) by 0 days.

(21) Appl. No.: 17/018,094

(22) Filed: Sep. 11, 2020

(65) Prior Publication Data
US 2021/0001825 A1      Jan. 7, 2021

Related U.S. Application Data

(63) Continuation of application No. 15/312,292, filed as application No. PCT/EP2015/061105 on May 20, 2015.

(30) Foreign Application Priority Data

| May 20, 2014 | (DE) | 10 2014 107 112.3 |
| Jul. 4, 2014 | (DJ) | 10 2014 109 384.4 |
| Jul. 9, 2014 | (DE) | 10 2014 109 628.2 |

(51) Int. Cl.
*B60T 8/40* (2006.01)
*B60T 7/04* (2006.01)
(Continued)

(52) U.S. Cl.
CPC .......... *B60T 8/4031* (2013.01); *B60T 7/042* (2013.01); *B60T 8/341* (2013.01); *B60T 8/344* (2013.01);
(Continued)

(58) Field of Classification Search
CPC ...... B60T 8/4031; B60T 8/341; B60T 8/4022; B60T 8/344; B60T 13/745; B60T 13/686; B60T 13/146; B60T 7/042
See application file for complete search history.

(56) References Cited

U.S. PATENT DOCUMENTS

| 4,143,514 A | 3/1979 | Leiber |
| 9,321,444 B2 * | 4/2016 | Ganzel ................. B60T 8/4081 |

(Continued)

FOREIGN PATENT DOCUMENTS

| CN | 103038110 A | 4/2013 |
| DE | 102005055751 A1 | 11/2006 |

(Continued)

OTHER PUBLICATIONS

Int'l Search Report dated Oct. 15, 2015 in Int'l Application No. PCT/EP2015/061105.

(Continued)

*Primary Examiner* — Vishal R Sahni
(74) *Attorney, Agent, or Firm* — Panitch Schwarze Belisario & Nadel LLP

(57) ABSTRACT

The disclosure relates to an actuating system for a vehicle brake, with an actuating arrangement, in particular a brake pedal, at least one (first) piston-cylinder unit, which is connected via a hydraulic line to the vehicle brake (braking circuit) in order to supply the braking circuit with pressure medium and apply pressure to the vehicle brake, and with a drive for the piston-cylinder unit. Pressure medium can be fed to the braking circuit in controlled manner in both piston movement directions, in particular the advance stroke and the return stroke, by means of at least one, in particular stepped, piston of the piston-cylinder unit.

21 Claims, 9 Drawing Sheets

(51) Int. Cl.
  *B60T 13/14* (2006.01)
  *B60T 13/74* (2006.01)
  *B60T 8/34* (2006.01)
  *B60T 13/68* (2006.01)

(52) U.S. Cl.
  CPC .......... *B60T 8/4022* (2013.01); *B60T 8/4081* (2013.01); *B60T 13/146* (2013.01); *B60T 13/686* (2013.01); *B60T 13/745* (2013.01); *B60T 8/4018* (2013.01)

(56) References Cited

U.S. PATENT DOCUMENTS

| | | | |
|---|---|---|---|
| 9,487,201 B2 * | 11/2016 | Linden | F04B 5/02 |
| 10,752,227 B2 * | 8/2020 | Jung | B60T 7/042 |
| 2014/0379234 A1 | 12/2014 | Kato et al. | |
| 2015/0035351 A1 | 2/2015 | Okano | |
| 2015/0166024 A1 | 6/2015 | Biller | |
| 2015/0175145 A1 | 6/2015 | Nakata et al. | |
| 2016/0009263 A1 | 1/2016 | Feigel et al. | |
| 2016/0016571 A1 | 1/2016 | Ganzel | |
| 2016/0031426 A1 * | 2/2016 | Feigel | B60T 13/662 |
| | | | 303/115.2 |

FOREIGN PATENT DOCUMENTS

| | | |
|---|---|---|
| DE | 102008051316 A1 | 2/2010 |
| DE | 102009043484 A1 | 3/2011 |
| DE | 102010045617 A1 | 3/2012 |
| DE | 102011017436 A1 | 10/2012 |
| DE | 102011050587 A1 | 11/2012 |
| DE | 102012205962 A1 | 11/2012 |
| DE | 10 2012 002 791 A1 | 8/2013 |
| DE | 102012222897 A1 | 8/2013 |
| DE | 102013203189 A1 | 9/2013 |
| DE | 102012103506 A1 | 10/2013 |
| DE | 102013110188 A1 | 3/2015 |
| DE | 10-2013111974 A1 | 4/2015 |
| DE | 10-2014102536 A1 | 8/2015 |
| DE | 102014102536 A1 | 8/2015 |
| DE | 102014107112 A1 | 11/2015 |
| EP | 2641794 A1 | 9/2013 |
| FR | 2318060 A1 | 2/1977 |

OTHER PUBLICATIONS

Written Opinion dated Oct. 15, 2015 in Int'l Application No. PCT/EP2015/061105.
Office Action dated May 9, 2019 in U.S. Appl. No. 15/312,292 by Leiber.
Office Action dated Mar. 20, 2020 in U.S. Appl. No. 15/312,292 by Leiber.
Office Action dated Jun. 29, 2020 in U.S. Appl. No. 15/312,292 by Leiber.

* cited by examiner

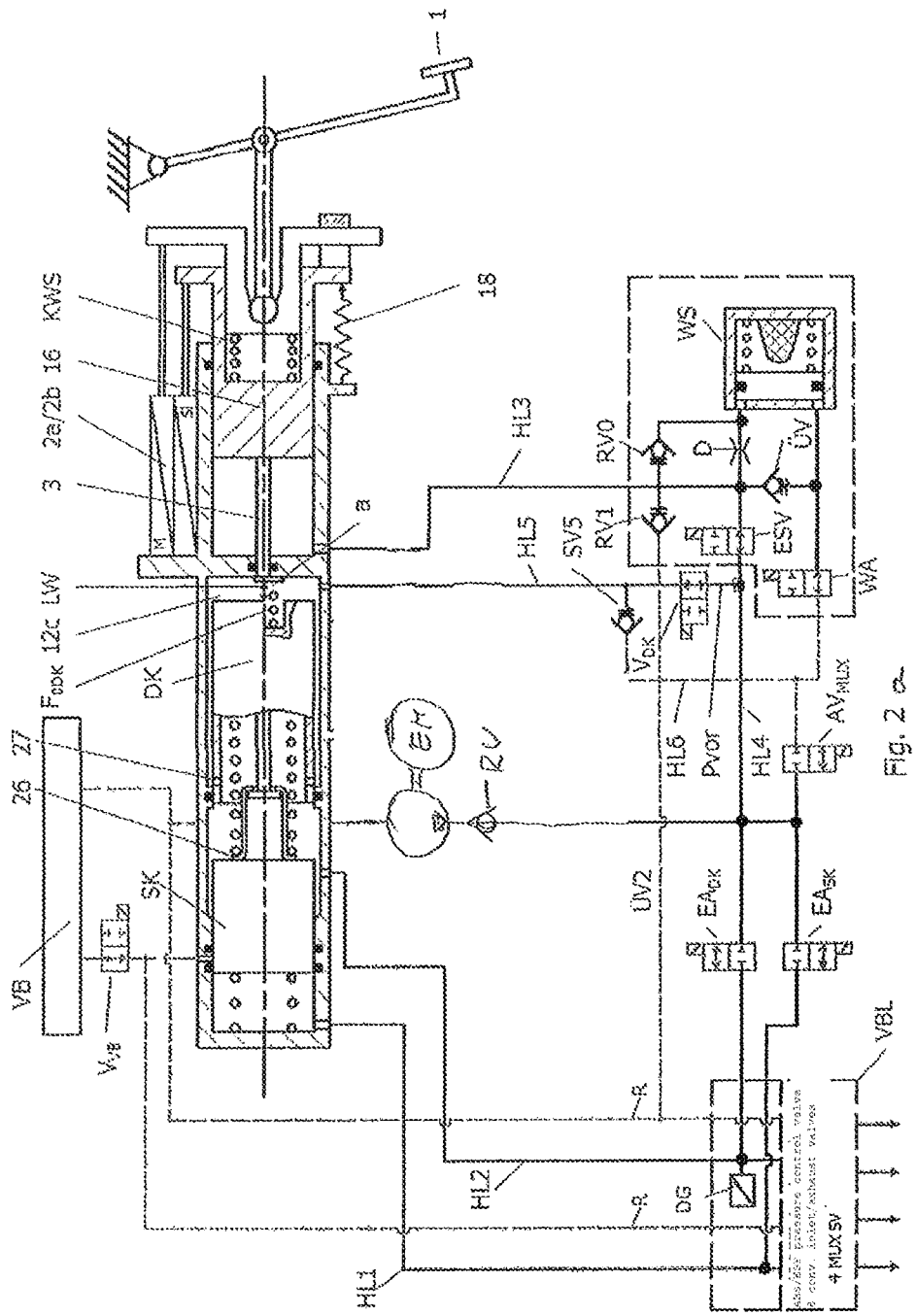

ACTUATING SYSTEM FOR A VEHICLE BRAKE AND METHOD OF OPERATING THE ACTUATING SYSTEM

CROSS-REFERENCE TO RELATED APPLICATIONS

This application is a Continuation of U.S. patent application Ser. No. 15/312,292, filed Jul. 11, 2017, which is a Section 371 U.S. National Stage Filing of International Application No. PCT/EP2015/061105, filed May 20, 2015, which was published in the German language on Nov. 26, 2015, under International Publication No. WO 2015/177207 A1, which claims priority to German Patent Application No. 10 2014 107 112.3, filed on May 20, 2014, German Patent Application No. 10 2014 109 384.4, filed on Jul. 4, 2014 and German Patent Application No. 10 2014 109 628.2, filed on Jul. 9, 2014, the disclosures of each of which are incorporated herein by reference.

The invention relates to an actuating system for a vehicle brake and a method of operating the actuating system.

PRIOR ART

Braking systems are subject to increasing demands. This is particularly the case in terms of reliability and a good fallback level. If the brake booster fails, then for the internationally prescribed foot force of 500 N, ideally a deceleration of more than 0.64 g should be achieved, which is considerably higher than the minimum required by law of 0.24. An advantage of the high achievable deceleration is also that a red warning lamp, which is irritating for the driver, does not have to be activated.

These demands can be met by brake-by-wire systems with a travel simulator. Here the master cylinder (HZ) or tandem master cylinder (THZ) is designed for the fallback level if the braking system fails. This is achieved by appropriate dimensioning with a small diameter. This results in higher pressures for a corresponding foot force. The necessary brake fluid volume for 0.64 g and corresponding pressure is relatively small compared to that at maximum pressure with full vehicle deceleration and fading. A THZ cannot fully deliver the necessary volume even with a longer stroke. DE 102009043494 of the applicant proposes a solution for this with a storage chamber, which at higher pressures feeds corresponding volume into the braking circuit. DE 102010045617 A1 of the applicant also describes a further solution, in which by means of suitable valve and THZ control, volume from the master cylinder is fed from the reservoir into the braking circuit. In vehicles with high volume uptake, e.g. SUVs and small vans, the filling of the braking circuits when braking must necessarily take place before the blocking pressure for high μ is required. Both solutions place high demands on the tightness of the valves. Furthermore, the additional filling of the braking circuits is associated with an interruption in the pressure build-up and minor braking losses.

DE 102011111369 of the applicant describes a system with an additional piston, which delivers the necessary pressure medium volume and has the advantage that it is operated by the motor spindle and is not active in the fallback level, e.g. allows the specified deceleration. The disadvantage here can be that in some cases correspondingly high forces arise which place stress on the spindle, the ball screw unit (KGT) and the bearings.

A further important consideration is the installed length. In this regard, there are two different types of braking system design, known as the "serial type" S and the "parallel type" P (hereinafter also referred to as "S system" and "P system"). What this means is that with the S system the main components (such as for example in DE 102011111369) of the master cylinder THZ, motor with ball screw unit KGT and auxiliary piston are arranged in a single axis and with the P system (such as for example in DE 10 2012222897 A1), the master cylinder THZ is arranged in one axis and a plunger for volume provision with motor is arranged in a laterally displaced second axis.

The P systems require less installed length, but are more complicated and less reliable than S systems. According to DE 102013111974.3 of the applicant a P system is implemented with a double stroke piston and THZ, the installed length and valve switching of which does not meet all requirements.

Object of the Invention

The object of the invention is to provide a system with a short installed length and great reliability.

Achievement of the Object

The object may be achieved according to the invention as defined by the accompanying claims.

Advantageous embodiments or designs of the invention are contained in the further claims, to which reference is made here.

Advantages of the Invention

With the solution according to the invention and its embodiments or designs, an actuating system for a vehicle brake and a method of operating the actuating system with reduced installed length and improved reliability are provided. Such an actuating system is also provided with a little constructional effort and less pressure loads from extreme pedal forces.

In an advantageous embodiment, in the hydraulic line sections between the working chambers of the first pressure source or piston-cylinder unit (master cylinder) and the valve block VBL containing the ABS/ESP control valves, unlike known systems no switching or isolating valves are provided. Pressure regulation can be advantageously performed with other means, in particular existing switching valves (such as EA or VDK). Hydraulic line sections leaving the working chambers of the second pressure source or piston-cylinder unit are connected prior to the valve block VBL with the line sections coming from the working chambers of the first piston-cylinder unit. In the former in particular in each case a non-return valve and a switching valve can be arranged.

From these line sections, which can be connected between the non-return valves and the switching valves, a further hydraulic line section can expediently be run to a working chamber formed on the rear of a piston of the first pressure source or piston-cylinder unit (master cylinder), in which in particular a switching valve is arranged.

A further advantageous design provides that a working chamber of a third pressure source or piston-cylinder unit (auxiliary piston) by means of a hydraulic line, in which in particular a valve device is arranged, is connected with at least one working chamber of the second (DHK) and/or first pressure source or piston-cylinder unit (master cylinder).

The invention or its embodiments/designs also provide sufficient brake fluid volume with an additional prefill function.

Further potential for improvement, in particular based on a brake mechanism according to the applicant's patent application DE 102013111974.3 with partial P design and DE 102014102536.9 with double stroke piston DHK and prefill function with S design (to which reference is hereby made), is also realised.

The solutions described in applicant's applications DE 102013111974.3 and DE 102014102536.9 (the content of which is included here by reference), or the main features of these, can advantageously also be applied or transferred to the invention or its embodiments/designs, such as for example fail-safe adaptive travel simulator with auxiliary piston and feed function in the fallback level, prefill function with its respective advantages such as short installed length, minimized complexity, and low pedal initial force, ideally comparable with the S design.

The system with serial (S) arrangement of THZ and Motor is longer in design than the parallel (P) system, in which the THZ and motor are arranged in separate axes. The P system, however, is more complex with housings and valves. With the extensive functions and dimensions described it is intended that the complexity of the P system can be reduced and that the functions can be expanded.

By hydraulically connecting the double stroke piston DHK with the secondary side of the plunger rod piston DK, a functioning of the P system similar to that of the S system is brought about, in which instead of the hydraulic pressure, the motor drive acts on the plunger rod piston DK. This is associated with a number of advantages, such as the pistons being loaded with real pressure and also piston displacement, in particular by the plunger rod piston DK, fault detection being easier and the ability to vary the volume supply to the braking circuits by different valve arrangements. Furthermore, at least one isolation valve can be dispensed with in the connection of the double stroke piston DHK. Similarly, fewer solenoid valves are required for the double stroke piston DHK and the feed valve can be dispensed with.

The piston-cylinder unit or the double stroke piston can also be replaced by a pressure source with continuous delivery, e.g. an electromotor-driven high pressure pump.

The valves used to open the braking circuit for pressure reduction are checked for tightness with each braking.

Furthermore, by alternate switching of the valves EA, a pressure sensor can be dispensed with, since the volume delivery by the double stroke piston DHK, in comparison with the pressure-volume characteristic curve and pressure, identifies both the volume intake and leakage or brake circuit failure.

The free travel proposed with the S design for installed length reduction and advantages in recovery, in that the THZ motor and double stroke piston DHK are not operated, can also be used in the P version. This allows considerably reduced wear.

Further features and advantages of the invention or its designs are indicated by the claims or the following description of the figures, to which reference is made here.

DESCRIPTION OF THE FIGURES

These show as follows:

FIG. 1a an additional spring arrangement in the floating piston SK;

FIG. 2a a system with a high-pressure pump, instead of a piston-cylinder unit;

FIG. 5a a system with simplified twin piston version;

FIG. 7c a cross bore arrangement.

Figure 1:
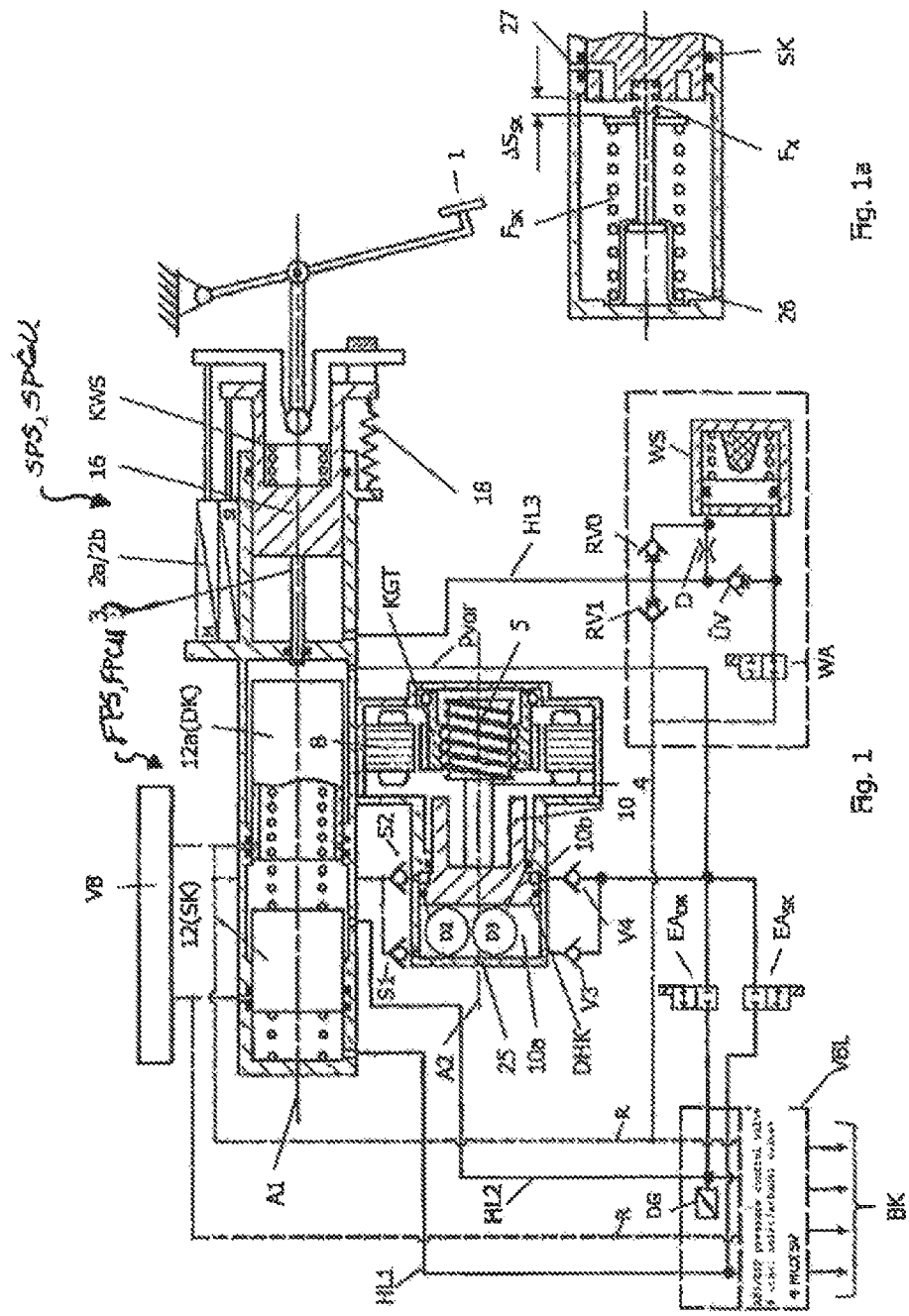
FIG. 1 a system in the P version with reduced complexity.

The system shown in FIG. 1 represents minimum complexity for minimum function. With this P design, on a first axis A1 a (first) piston-cylinder unit (FPCU; master cylinder) with plunger rod piston (DK) 12a and floating piston (SK) 12 and a further (second) piston-cylinder unit (SPCU) with a piston 16 (auxiliary piston) are situated, and on a second axis A2, which is radially displaced with respect to the first axis, a piston-cylinder unit with a double stroke piston (DHK), a ball screw unit (KGT) with spindle 5 and a drive motor 8 are situated. The piston-cylinder unit with auxiliary piston can also be arranged on a parallel axis, as for example in applicant's patent application DE 102011017436.2, in which the pedal plunger is arranged on the central axis of the master cylinder and two auxiliary pistons on axes displaced parallel thereto. From working chambers of the first piston-cylinder unit (master cylinder or THZ) hydraulic lines HL1 and HL2 (without isolation valve) are connected via a valve block (VBL) with wheel brakes (not shown). From working chambers 10a, 10b of the piston-cylinder unit with double stroke piston (DHK) line sections, in which non-return valves V3, V4 are arranged, and a common line section, leading to two further hydraulic line sections, in which (normally closed) switching valves EA are arranged, run to the hydraulic lines HL1, HL2 or via the valve block VBL to the wheel brakes. The working chambers 10a, 10b of the double stroke piston are in other words hydraulically connected via said line sections and valves EA with the working chambers of the first piston-cylinder unit. From the common line section a further line section branches off, which is connected to a working chamber 12c, formed by the rear of the piston (DK) of the first piston-cylinder unit.

From the working chambers 10a and 10b of the double stroke piston, hydraulic lines also run (shown by dashes), in which non-return valves are fitted, to a reservoir VB.

A travel simulator arrangement with a travel simulator WS with pistons, non-return valves RV0, RV1 and ÜV, and an aperture D and a solenoid valve WA is connected via a hydraulic line HL3 with a working chamber of the piston-cylinder unit with auxiliary piston 16 and corresponds to the travel simulator described in applicant's patent applications DE 102013111974.3 and DE 10 2104 102 536.9, to which in this respect reference is made. The pressure relief valve ÜV has two functions here: in normal functioning at high pedal speed to reduce the throttle force and similarly in the fallback level RFE, to allow the pedal force to be converted more quickly into pressure. The travel simulator arrangement can expediently be arranged parallel to the THZ or also in the valve block VBL.

Figure 4:
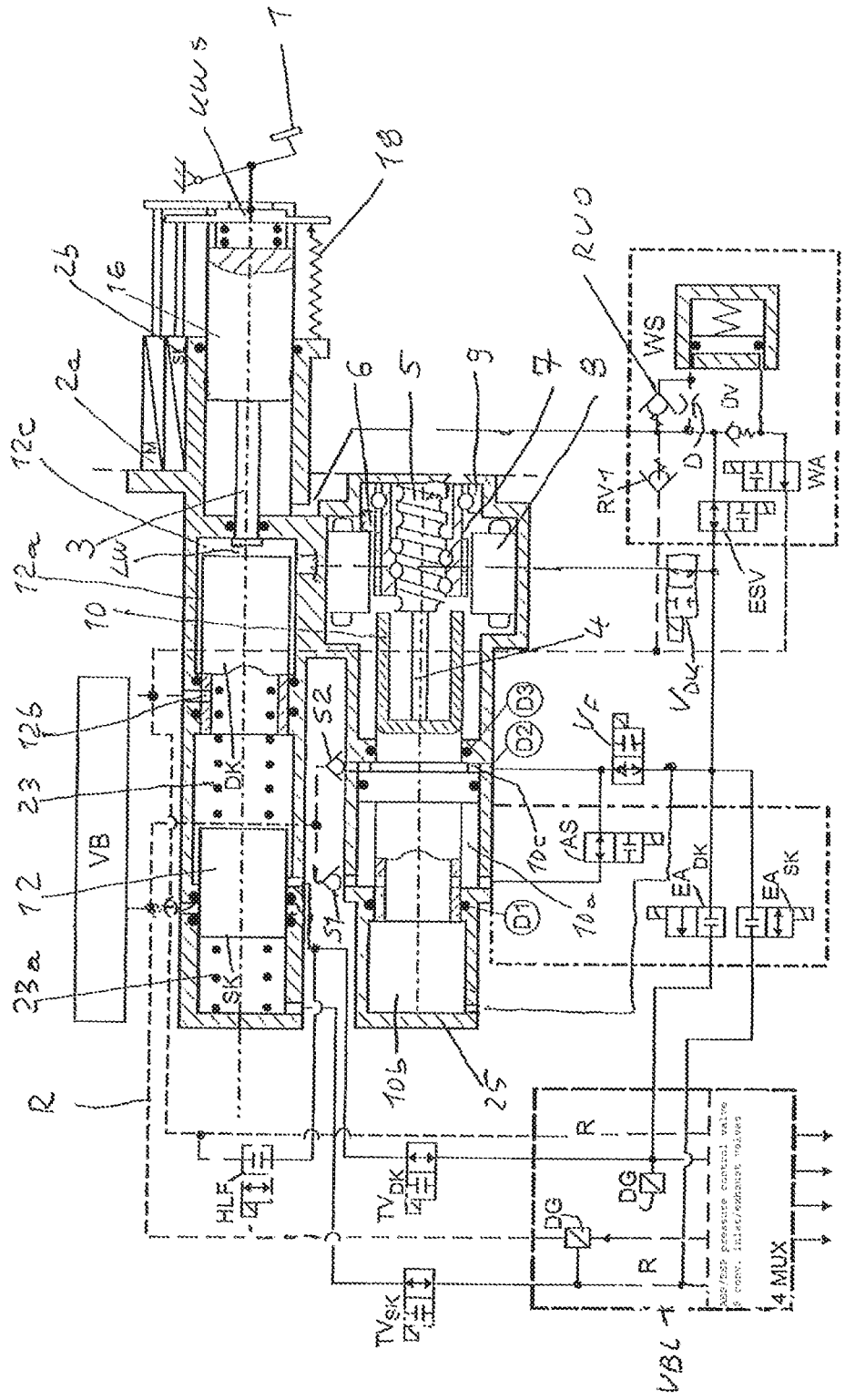
FIG. 4 a system in the P design with parallel double stroke pistons (DHK3) with three effective piston surfaces.
Figure 5:
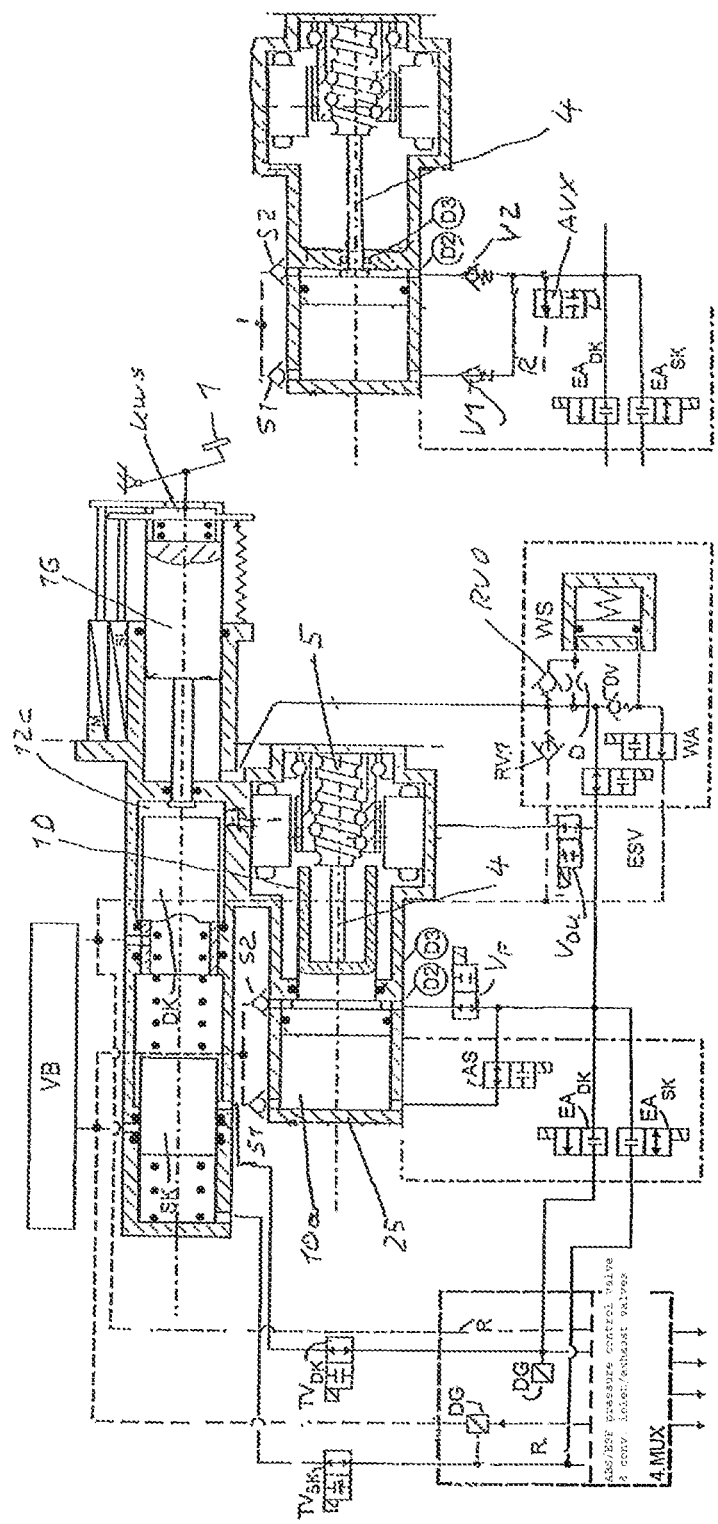
FIG. 5 a system in the P design simplified with parallel double stroke pistons (DHK2) with two pistons.

The working spaces of the plunger rod piston DK and the floating piston SK are connected via hydraulic line sections HL1 and HL2 with the valve block VBL, wherein in these line sections no valves, in particular no switching valves, are arranged (unlike the designs according to FIGS. 4 and 5. During pressure build-up $P_{auf}$ by means of the double stroke piston DHK initially a volume supply from the working chamber 10*a* of the double stroke piston DHK into the working chamber 12*c* of the plunger rod piston, e.g. to the rear of the plunger rod piston DK of the piston-cylinder unit (THZ), is effected, so that the pistons DK and SK develop or increase pressure in their pressure chambers or the lines HL1, HL2. Unlike the design shown in FIG. 6, therefore, the volume or pressure is directed from the piston-cylinder unit (THZ) via the pressure control valves (not shown) in the valve block VBL directly to the braking circuits (BK) or the wheel brakes. Pedal travel sensors 2*a*, 2*b* determine the pressure in the braking circuits BK, which is brought about via the drive of the double stroke piston DHK and appropriate volume supply. The travel simulator WS determines the pedal force characteristic. For a travel of ΔWS this travel simulator is activated, accounting for approximately 40% of the entire travel of the pedal plunger. The volume supply can in a first operating mode 1 be changed for the corresponding travel in that by opening the two valves EA volume directly from the working chamber of the double stroke piston DHK reaches the hydraulic lines associated with the pistons DK and SK. Here the pistons DK and SK remain in the position, indicated by the travel of the DK piston or the spring forces of the springs of the pistons DK and SK. By switching the valves EA there is in practice the same pressure on both sides of the pistons SK and DK, so that the plunger rod piston DK rests on the pedal plunger (PS) 3, provided the springs are suitably coordinated. This can be performed selectively with an additional spring, as for example described in connection with FIG. 1*a*.

A progressive spring characteristic of the floating piston SK, allows the plunger rod piston DK to stay in position for a travel of ΔWS and the floating piston SK to have a particular distance to the plunger rod piston DK.

The positioning of the plunger rod piston DK on the pedal plunger 3 is preferably used in the ABS function (operating mode 2). The ABS function can also be performed before the full travel ΔWS, since here the maximum brake pressure of, for example, 200 bar is applied. The ABS function can be performed at a low μ of just 10 bar and a correspondingly low travel of the pedal plunger 3. Here also, the plunger rod piston DK is intended to come up against the pedal plunger 3. With further movement of the pedal plunger 3 this causes additional counterforces due to friction and spring forces and compressive force via the pedal plunger 3. This is quite advantageous, because a small reaction by ABS against the pedal 1 is desirable. This can be further reinforced and modulated by varying the admission pressure Pvor by means of the double stroke piston DHK.

The starting position of the floating piston SK with stroke reserve is of major significance for the "worst case" failure of the motor at low μ and subsequent positive μ-jump. Here the floating piston SK can only deliver enough volume, if it has sufficient stroke and is not already up against the end of the housing. With the abovementioned coordination, the pistons SK and DK deliver volume via the residual stroke, without the pistons DK and SK clashing, whereupon disadvantageous asymmetric brake pressures would arise.

For diagnosis of the position of the floating piston SK this can be implemented with a sensor (not shown here).

The pressure build-up $P_{auf}$ takes place for as long as the pedal travel sensors 2*a*/2*b* specify this to the motor controller. If, for a high pressure level or volume, e.g. during fading, the volume of the double stroke piston DHK in the advance stroke via the pressure relief valve S1 is insufficient, then in the return stroke a further volume boost takes place via valve S2.

With this valve switching of the suction valves S1 and S2 with pressure relief valves V3 and V4 the double stroke piston DHK is no longer able to perform additional functions such as prefilling or pressure reduction $P_{ab}$. These are described in the following figures with additional valve complexity.

The eight valves necessary for pressure regulation (four inlet valves EV and four exhaust valves AV) or alternatively four switching valves SV in multiplex operation MUX are contained in the valve block VBL.

With the ABS function the double stroke piston DHK works continuously with advance stroke and return stroke, since the volume drawn for the pressure reduction $P_{ab}$ via the exhaust valves AV must be repeatedly requested. If a pressure reduction $P_{ab}$ initiated by the pedal sensors 2*a*/2*b* takes place, then this similarly takes place via the valves AV in the return stroke R. This preferably takes place via only one valve AV, e.g. in the DK circuit with open valves EA.

For reduced complexity, there is also only one pressure sensor DG. It is possible to determine the pressure in both braking circuits with just one pressure sensor, since the floating piston 12 equalises the pressure between the two braking circuits.

This takes place independently of the switching position of the E/A valves. If a pressure build-up is performed by the double stroke piston DHK via the E/A valves directly in the braking circuits (e.g. during ABS) it is possible by alternating switching of the valves EA of the double stroke piston DHK in each case to boost only in the respective braking circuit, so that the braking circuits are never directly connected with one another.

The functions of the double stroke piston DHK and the travel simulator WS are also described in applicant's patent applications DE 102010045617 A1, DE 102013110188.7, DE102014102536.9 and DE 102014107112.3, to which reference is hereby made in this connection.

FIG. 1*a* shows a spring arrangement with an additional spring on the floating piston SK. Here a spring housing 26 with floating piston-spring $F_{SK}$ is shown, as is standard in tandem master cylinders THZ. In addition, here a spring $F_x$ arranged between the floating piston and spring housing acts, corresponding to the starting spring force of the conventional spring of the floating piston SK. It is known that this is designed such that as a result the floating piston SK and plunger rod piston DK are reset and the friction forces overcome. The spring of the plunger rod piston DK, on the other hand, is constrained to a high force level. Thus, with a correspondingly progressive spring design of the floating piston SK, simultaneous closing, when there is a pressure build-up $P_{auf}$ by both pistons DK and SK of the cross bore 27 or the cross bore not shown here of the plunger rod piston DK (shown in FIG. 1*a* in the open position) can be achieved. With this arrangement as well, this is the case by corresponding dimensioning of $F_x$, which has the same force as a conventional spring of the floating piston SK. Normally, when there is a pressure build-up $P_{auf}$ the distance between the floating piston SK and plunger rod piston DK is determined by the volume uptake of the braking circuits, wherein the pressure forces overcome the spring forces. In the abovementioned case, by parallel connection of the valves EA an almost even pressure level results, so that the compressive forces are not applied and the respectively acting spring and friction forces determine the position of the pistons. In the case described with the parallel connection of the valves EA it is intended that the plunger rod piston DK rests on the pedal plunger PS, which is possible by spring adjustment.

At high temperatures and with no rain (when, therefore, normally no μ-jump is possible) operating mode 1 can be activated, in which the parallel connection of valve EA does not take place and the floating piston SK and if necessary also the plunger rod piston DK are moved to the stroke end. This has the advantage that the seals can in each case be checked over the full stroke, such that "dormant failures" are impossible.

Figure 2:
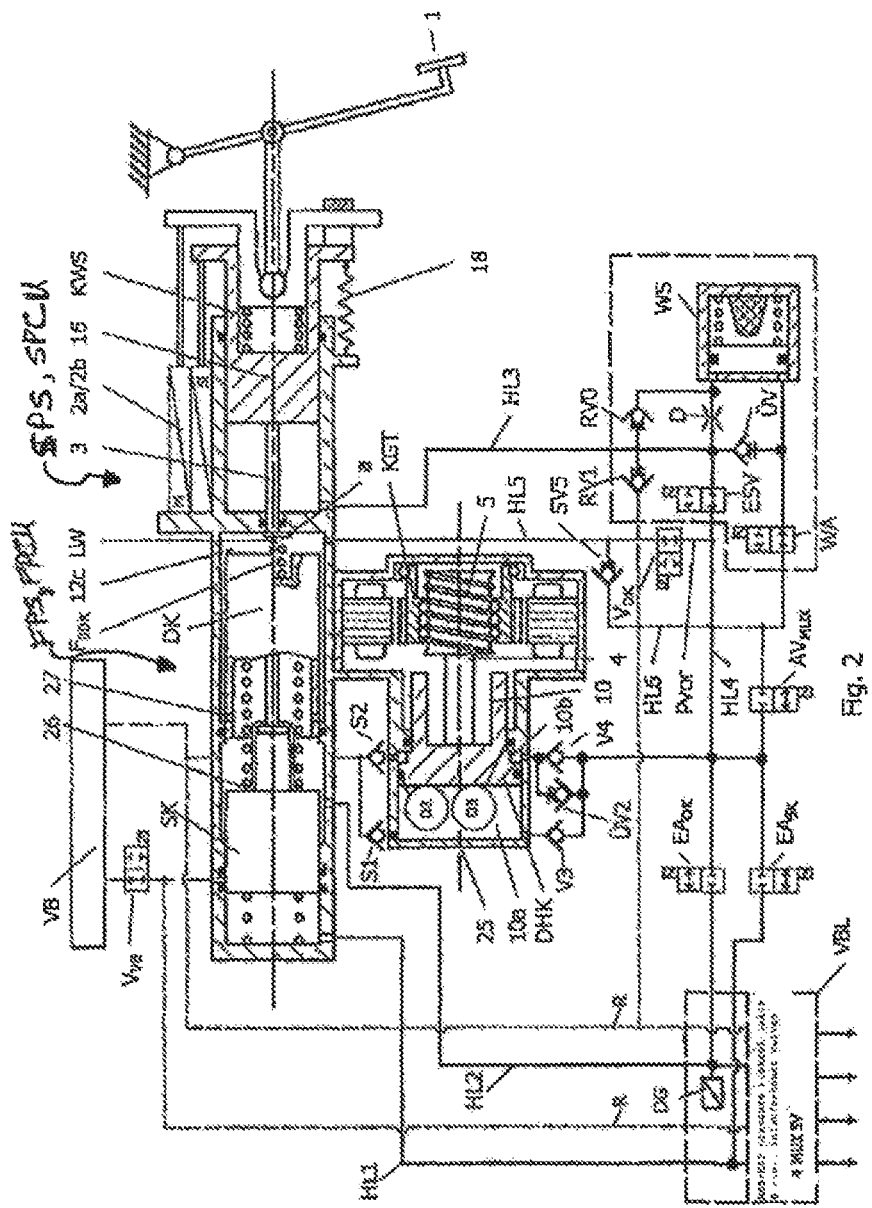
FIG. 2 a system as in FIG. 1 with simplified valve switching of a double stroke piston DHK.

FIG. 2 shows the next configuration level with valves ESV in line section HL4 and $V_{DK}$ in line section HL5, and with SV5 in line section HL6, and correspondingly expanded functions.

The feeding-in ES of additional volume into the braking circuits BK has major advantages at the fallback level RFE, since the additional volume results in a higher pressure level or shorter pedal travel. The feeding-in ES, however, requires that the valve $V_{DK}$ is closed, so that a pressure equalisation, which occurs when the valve EA is open, is prevented here. Thus, the feeding-in via the valve EA is possible optionally in one braking circuit BK or both together. Since during feeding-in, compressive forces from auxiliary piston 16 and also plunger rod piston DK act on the pedal 1, the feeding-in ES is limited to pressures of, for example, 20-25% of the blocking pressure, e.g. 20-25 bar due to excessive pedal forces. Following the feeding-in ES the valve ESV is closed (operating mode 5). This is effective with 30-40% additional volume in the fallback level RFE. Since the pressures in the fallback level RFE are lower than is normally the case, the valve $V_{DK}$ can have a correspondingly smaller design in the switchable pressure range. This allows larger cross-sections or lower magnetic forces, which is cost-relevant.

Since with the valve $V_{DK}$ closed, the plunger rod piston DK is moved via the pedal plunger PS, the valve SV5 is necessary to avoid a depression as the piston moves. With the pressure reduction $P_{ab}$ the valve $V_{DK}$ is opened, and the volume reaches the reservoir VB via the open valves ES and WA or similarly the reservoir VB via the valves EA and AV.

Here a free travel LW between pedal plunger 3 and the plunger rod piston DK can be employed, which in combination with valve ESV provides advantages, namely no activation of the double stroke piston DHK and of the motor for pressure build-up and pressure reduction or no piston operation during recovery and a reduction in installed length.

Figure 6:
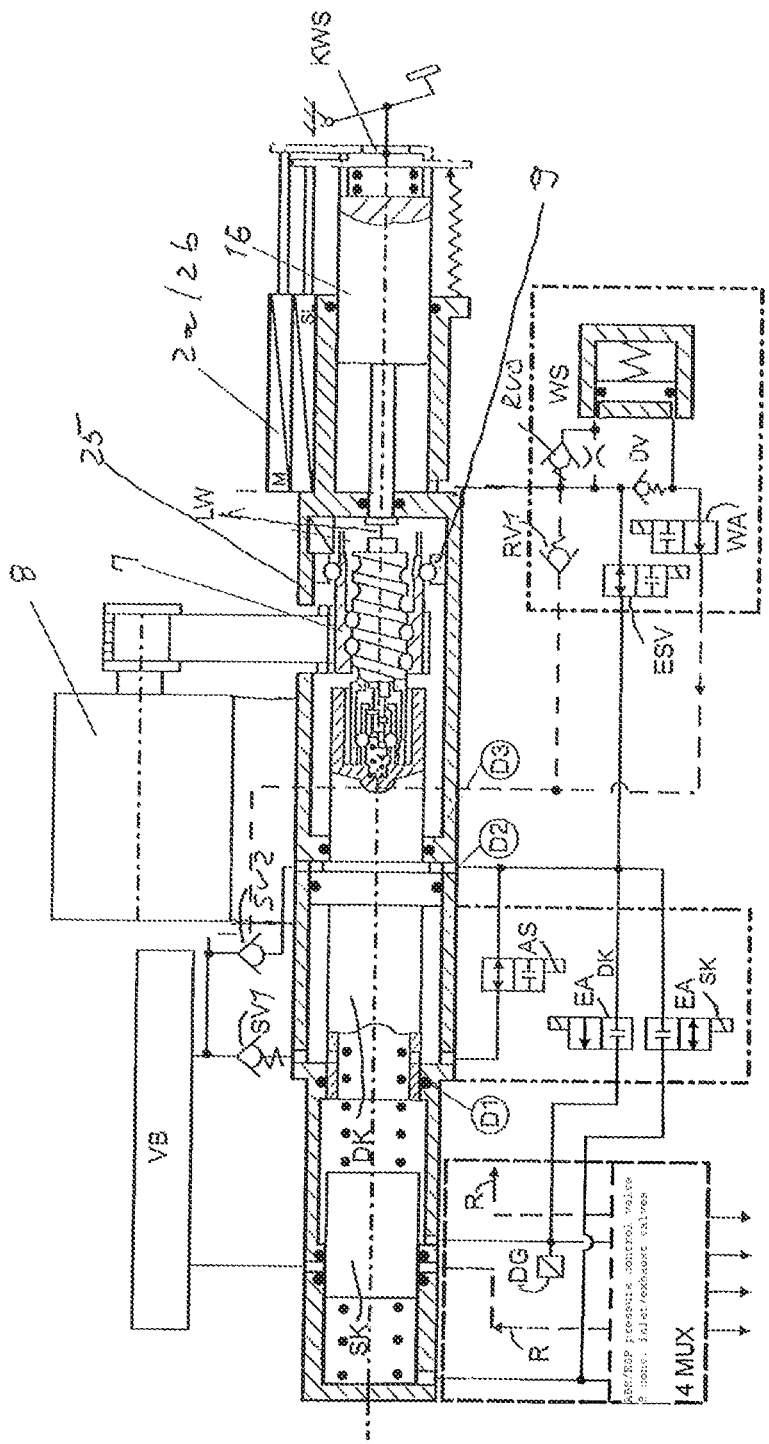
FIG. 6 a system in P design with a motor arranged in parallel with drive belts.

The plunger rod piston DK does not have a standard design here as in a conventional THZ with two seals (the second seal serves to avoid external oil leaks). In FIGS. 4 and 6, for example, the plunger rod piston DK is combined with the double stroke piston DHK as a 3-piston solution and advantageously has just one seal with its pressure chamber. This design with just one seal D1 can also be used here without combining with the double stroke piston DHK and without stepped piston for the non-stepped cylindrical plunger rod piston DK. A coupling of the spring housing 26 with the floating piston SK is required here, however. This is necessary so that during pressure build-up $P_{auf}$ the piston SK pulls the piston DK normally through the cross bore 27 of the plunger rod piston, since here the volume from the double stroke piston DHK flows via the open cross bore 27 of the plunger rod piston DK into the braking circuit associated with the piston DK and the corresponding pressure acts on the braking circuit associated with the piston SK. With further pressure build-up and the cross bore of the plunger rod piston DK closed, the admission pressure acts on the rear of the braking circuit associated with the piston DK and continues to move the piston DK for further pressure build-up. This is achieved in that in the first phase of the pressure build-up $P_{auf}$, the valve EA of the plunger rod piston DK is open until through corresponding volume of the double stroke piston both cross bores are closed, since here the pressure of the plunger rod piston DK acts on the floating piston SK. Then the valve EADK is closed again and the admission pressure Pvor acts on the plunger rod piston DK for pressure build-up (operating mode 4)

During braking, a phase of constant pressure (e.g. no change in pedal travel) often occurs in the travel simulator step 1 (pressure range<30 bar). This is used to diagnose the leak tightness of all components, including the valves EA. Here valve VDK and valve EA are closed, the motor position is unchanged, and the valves ESV and WA are open, wherein if all components of the braking circuits are leak tight, no pressure reduction should take place. In particular, the valves EA are in practice tested during each partial braking (80%) of all braking operations.

Figure 3:
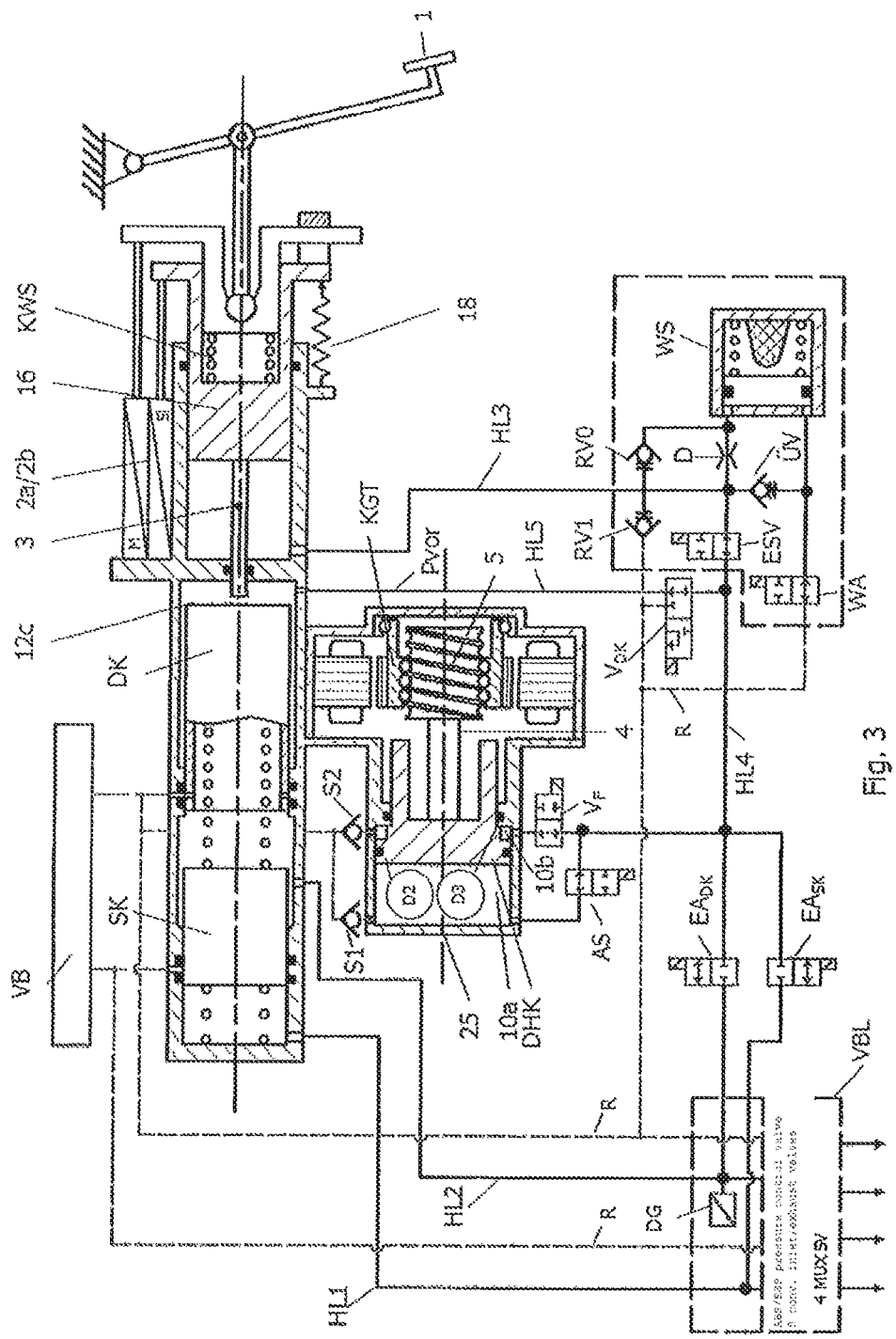
FIG. 3 a system as in FIG. 1 with additional valves of the tandem master cylinder to the reservoir.

Advantages of the design according to FIG. 2 are:
if the plunger rod piston DK secondary seal fails, unlike in FIGS. 1 and 3 there is no failure of the brake booster BKV. In the event of failure of the DK seal in FIG. 2, the brake booster BKV does not fail either. The function of the seal must be checked at regular intervals, which can take place when the vehicle is at a standstill, for example;
lower piston friction;
lower stressing of the sleeve gaskets, since the volume during pressure build-up $P_{auf}$ opens the sleeve;
a design with free travel LW is possible, since the feeding-in volume at the auxiliary piston reaches the pressure rod DK circuit directly via the cross bore.

As is known, the braking system must also be designed for maximum pedal forces that are 12 times greater than the pedal force upon reaching the blocking pressure. This affects the pressure loading of the auxiliary piston, the housing of the auxiliary piston and valves ESV and WA. The existing valve switching offers a simple solution to this. If this case arises and the valve WA designed for a low pressure level, e.g. 200 bar, opens at this pressure, then a pedal movement occurs, which is measured by the pedal sensors 2a/2b. This leads to the closing of valve $V_{DK}$. The pedal plunger acts on the plunger rod piston DK, and a depression occurs on the secondary side of the plunger rod piston DK. The pressure of the plunger rod piston acts on the primary side, and can be increased to 200 bar on the abovementioned signal. Thus, the pedal force is equalised by two pistons rather than one, leading to a significant reduction in pressure level for the abovementioned components (operating mode 5).

In the event of failure of the travel simulator, e.g. due to a leak, the functioning of the travel simulator WS normally fails, e.g. the pedal force reaction is absent. The applicant's patent applications DE 102014102536.9 and DE 102014107112.3 have already created the possibility that with the travel simulator arrangement shown with auxiliary piston 16 what is referred to as follow-up brake boosting can be switched to, so that as with a conventional vacuum-brake servo the pedal force contributes to the brake booster, where longer pedal travel may have to be taken into consideration.

A failure of the travel simulator is also possible with the system according to FIG. 2. Following operation of the brake pedal, in the first step only the return spring 18 acts on the pedal force, e.g. the pressure reduction $P_{ab}$ takes place as described by a corresponding motor controller via the pedal travel sensors 2a/2b. The failure of the travel simulator WS is only identified if the valve WA should close for a certain pedal travel. If it does not do so, e.g. due to failed seals also, then this is detected via the force-travel sensor KWS. The pressure build-up $P_{auf}$ then takes place normally following the signal from the pedal travel sensors 2a/2b. Here volume or pressure is also triggered on the rear of the plunger rod piston DK and in parallel to the prefilling of the braking circuits BK via the two valves EA, i.e. all that is missing is the counterforce of the travel simulator WS. A small counterforce acts on the pedal plunger. A larger counterforce can be developed by closing the valve $V_{DK}$. As a result of depression, the full compressive force of the plunger rod piston DK acts on the pedal plunger PS 3. By actuation of the $V_{DK}$ valve by pulse width modulation PWM, with the help of the force-travel sensor KWS a counterforce can be developed. Alternatively, the valves EA can be closed after prefilling. Then the pedal force and motor controller act with appropriate volume supply due to the brake boosting (operating mode 7). Here the brake boosting effect can be reduced if necessary. For prefilling, in this valve arrangement with valves V3 and V4, instead of an additional solenoid valve (see, for example, valve VF in FIG. 3) a pressure relief valve ÜV2 can be used, which in particular is arranged in a connecting line between the line sections containing non-return valves V3, V4, wherein for example, up to 30 bar prefilling with larger piston surface takes place and then above 30 bar volume flows for pressure equalisation to the rear of the double stroke piston DHK. Thus, up to 30 bar the large piston area of the double stroke piston DHK acts and at >30 bar as a result of the pressure equalisation a smaller effective surface acts for volume supply.

For the application of the multiplex method (MUX) for pressure modulation, for the pressure reduction function during brake boosting operation a valve AVMUX is necessary. In this case, with valves EA open, volume for pressure reduction can reach the return flow, providing a pressure build-up for additional volume with return stroke (RH) (fading) takes place via the double stroke piston DHK. During normal braking, this valve AVMUX is unnecessary.

A failure of the secondary seal of the floating piston must also be considered. Essentially, normally (no failure) the Pvor acts on the plunger rod pistons DK and displaces the pistons DK for pressure build-up in both braking circuits. In the above case the volume would flow from the VDK via the cross bore of the plunger rod piston DK and the failed seal. This can be prevented by the following measures:
- the cross bores act as chokes, so that the dynamic pressure before the plunger rod piston DK moves the DK-piston;
- in the return line from the floating piston SK to the reservoir VB a valve VVB is connected, which in the event of failure closes or for each braking process closes briefly until a corresponding stroke of the piston DK takes place at which point the cross bore of the floating pistons SK is securely closed;
- an additional spring on the plunger rod piston DK at a distance from the pedal plunger PS. This is preloaded with a force greater than the preloading of the SK spring, so that the PS after a distance a moves the DK piston and thus closes the cross bore at the plunger rod piston DK. Pvor then acts and DK comes up against the floating piston SK for pressure build-up in the floating piston SK and in the case of failure of the DK braking circuit. The BKV operation is thus not jeopardised.

In the absence of a failure, the additional spring is inactive, since the DK piston is moved by the Pvor pressure, see also operating mode.

FIG. 2a shows an alternative to the double stroke piston DHK, with a pump driven by an electric motor. This can be a gear, vane or piston pump. The motor can expediently be an EC motor. A piston pump does not need an additional non-return valve, unlike a sliding vane pump, since its operating states are at constant pressure without volume delivery, so that here there is no return flow. If for the brake booster BKV mode the pressure reduction is not intended to take place via exhaust valves AV of the ABS pressure regulator device VBL, this is performed via valve AVMUX. With such a system, however, there is no prefilling VF and also no multiplex operation (MUX), nor any pressure reduction as is possible with a double stroke piston DHK with valve AS.

FIG. 3 shows a system with additional functions and valve alternatives. The suction valve SV5 can be avoided by having a 3/2-$V_{DK}$ valve. In the normally open state of the double stroke piston DHK and plunger rod piston DK the return flow is closed. In the fallback level RFE, unlike in the switched state, the connection between double stroke piston DHK and plunger rod piston DK is isolated and that to the reservoir VB open.

The valve arrangement of the double stroke piston DHK with valves AS and VF is known from the applicant's DE 102014107112.3, with the valves TV being left out. Here the valve AS allows a pressure reduction with the open valves EA without opening of the braking circuits BK by valve AV. The valve ESV is closed and only open in fallback level 3 with a failure of the vehicle electrical system, which is particularly effective with a plunger rod piston DK according to FIG. 2.

All systems shown have in common that both the pedal travel plunger 3 and the double stroke piston DHK can act on the plunger rod piston DK with volume delivery and corresponding pressure. By appropriate valve switching the following operating modes (BM) are possible:

1. The pressure source or high-pressure pump or the double stroke piston (Pvor) acts on the rear of the plunger rod piston DK, the valves EA are closed both during the forward stroke and if necessary also during the return stroke, the pedal plunger 3 has no contact with the plunger rod piston DK;
2. The pressure source or high-pressure pump or the double stroke piston ($P_{vor}$) acts on the plunger rod piston and via valve EA directly in the braking circuits BK, wherein for example in the ABS mode the pedal plunger 3 is in contact with the plunger rod piston DK);
3. The pedal plunger 3 acts in the fall-back level directly on the plunger rod piston (applies to the system according to FIG. 1)(the operating modes 1-3 apply to a system according to FIGS. 1, 2 and 3);
4. Prefilling of the braking circuits BK or first phase of the piston operation in the system according to FIG. 2, valve EADK is briefly opened, the floating piston SK moves with the plunger rod piston DK as a result of the coupling until both the cross bores associated with the pistons are closed by corresponding activation of the stroke of the double stroke piston or volume and/or pressure measurement in the braking circuit associated with the piston DK. DHK acts in plunger rod piston DK, the pedal plunger 3 is not in contact with the plunger rod piston DK;

5. The pressure source or the double stroke piston DHK acts via valve EA in the braking circuits; valve VDK is closed, e.g. during the highest pedal force together with pedal plunger 3;
6. The feeding-in of volume from the auxiliary piston acts in the fall-back level RFE 2 (motor failure) and 2a (motor failure with low μ with subsequent positive μ-jump) via valve EA in the braking circuits BK; valve VDK is closed, valve ESV is open, during free travel LW the pedal plunger 3 is only in contact with the plunger rod piston after this free travel (applies to systems according to FIGS. 2 and 3);
7. The pressure source or the double stroke piston DHK acts via valve VDK together with the pedal plunger on the plunger rod piston. The valve VDK controls the brake power boosting if necessary via KWS. This arrangement acts as what is known as a follow-up booster if the travel simulator WS fails;
8. The pedal plunger acts on the plunger rod piston in the fallback level with and without feeding-in for pressure generation.

The advantages common to the systems according to FIGS. 1, 2 and 3 include:

During normal braking (without considering ABS) the SK and DK seals are loaded by >90% with directly acting brake pressure, i.e. no "dormant failures" can occur here (exception: DK seal in FIG. 2; wear of the seal is low, however, due to the absence of loading by pressure and cross bore).

In other systems, only the slight pressure from the travel simulator WS acts on the THZ, harbouring failures that are dormant until in the fallback level a substantially higher pressure (by a factor of approximately 2 to 3) acts. The effect is even more extreme if the high pedal forces described occur.

ABS causes a small pedal reaction;

Reduction in the installed length by parallel arrangement of motor and THZ;

The travel simulator WS with auxiliary piston is highly reliable;

With each pressure build-up the tightness of the EA valves is tested, avoiding dormant failures;

If seals fail, the brake booster BKV does not fail, which is important for a normal driver who, despite there being a smaller master cylinder piston in travel simulator systems, requires >4 times more pedal force for the same braking if the brake booster BKV fails;

With the small additional cost of a VF valve a more rapid pressure build-up $P_{auf}$ is possible by $V_F$, resulting in a shorter braking distance;

Since isolation valves TV are not present or are absent, the system is simpler and more reliable with a few knock-on effects as described.

The cost of this is low compared with competing systems.

In the following the embodiments shown in FIGS. 4-6 are described. In the embodiments, according to FIGS. 4 and 5 isolation valves TV are arranged in the lines from the THZ to the valve block VBL. Valves AS, VF and VDK are also provided.

FIG. 4 shows the P design, in which in the first axis a piston-cylinder unit with a piston 16 (auxiliary piston), a further piston-cylinder unit (THZ) with DK piston 12a and SK piston 12 are located, and in the second axis, which in relation to the first axis is laterally or radially displaced, a piston-cylinder unit with a double stroke piston (DHK), a ball screw unit (KGT), with spindle 5 and a drive motor 8 are located. From working chambers of the further piston-cylinder unit (THZ), hydraulic lines, in which the solenoid valves TV associated with the braking circuits are connected, are connected via a valve block (VBL) with wheel brakes (not shown). From working chambers of the piston-cylinder unit with double stroke piston, hydraulic lines, in which the solenoid valves EA associated with the braking circuits are arranged, similarly run via the valve block VBL to the wheel brakes.

From the working chambers 10a and 10c of the double stroke piston, hydraulic lines, in which non-return valves S1 and S2 are connected, also run to reservoir VB.

A travel simulator WS with piston, non-return valves RVO, RV1, aperture D and solenoid valves ESV, WA is connected via a hydraulic line with aperture D or non-return valve RVO with a working chamber of the piston-cylinder unit with auxiliary piston and corresponds to the travel simulator described in the applicant's patent applications DE 102013111974.3 and DE 102014102 536.9, to which reference is made in this connection. A pressure relief valve ÜV here has two functions: during normal functioning at high pedal speed, to reduce the plunger force and similarly in the fallback level RFE, to allow the driver to convert the pedal force more rapidly into pressure. The travel simulator WS can expediently be arranged parallel to the THZ or in the valve block VBL.

During normal functioning, in the event of pedal operation of the auxiliary pistons 16, a force-travel-simulator (see applicant's DE 102010045617.9) and pedal travel sensors 2a, 2b are activated. These activate the motor 8, which via the spindle 5 with KGT 7 via the piston plunger 4 drives the double stroke piston (DHK3) 10 with three or (DHK2) with two pistons or effective piston surfaces.

The volume delivery in the braking circuit is performed in the S design and the P design by the double stroke piston DHK. The volume delivered is determined by the effective piston surface and the piston stroke. With the S design the delivery is performed during the forward stroke directly into the braking circuit and with the P design via the EA valves into the braking circuit. During the return stroke, both with the S design and the P design, the delivery is performed via the EA valves. If what is referred to as prefilling VF takes place, then as a result of valve switching the effective piston surface is greater. Depending on the different demands on the S design and P design, the double stroke piston DHK is configured with three (DHK3) and/or two (DHK2) effective piston surfaces.

For the application in the S design, the double stroke piston DHK must deliver the volume in the braking circuit for pressure build-up during the forward stroke and similarly during the return stroke. Since here the piston with seal D1 and D3 draws volume from the braking circuit, the annular surface must be suitably dimensioned. Furthermore, during prefilling it is intended that the effective piston area is increased. Here, the volume from the annular surface is pushed through under the unilaterally operating sleeve gasket, with the advantage that this already takes place in the area of the cross bore and thus relieves the gasket.

In addition, a piston movement with the generation of a depression in the brake calliper is desirable for setting the lining clearance, to reduce the residual frictional moment and thus the C02. Here the seal D1 must be depression-proof. The result is a double stroke piston DHK3 with three effective surfaces. This can also be used in a P arrangement (e.g. according to FIG. 4).

One piston area of the double stroke piston DHK2 can be reduced by giving up the underpressure delivery. Furthermore, with the double stroke piston DHK, as shown in FIG. 5a and further described below, the isolation valve can be dispensed with. However, here the reduction in braking circuit BK pressure must take place either via the ABS valves AV or an additional valve AUX.

The volume delivery in the braking circuit correlates with the volume increase as a function of the pressure for the individual wheel circuits or the braking system as a whole. This is referred to as the p-v curve. Therefore, the correlation can be used for diagnosing the braking circuit (fill level, leakage, BK failure). But also for the abovementioned pressure control for the pressure build-up $P_{auf}$ and also the pressure reduction $P\underline{ab}$. Here a "partial multiplex" (Part-MUX) can be provided for, wherein the multiplexing process is used only for the pressure build-up or the pressure reduction, as described in more detail in the applicant's patent application DE 102005055751, to which reference is made in this connection.

The piston plunger preferably has an elastic configuration, so that under the impact of the spindle a lower transverse force on the double stroke piston (DHK) 10 is developed. The torque support is not implemented here and corresponds to the torque support described in the applicant's DE 102012103506, to which in this respect reference is made. The functions of the double stroke piston (DHK3) 10 with suction valves S1 and S2 with isolation valve AS correspond to the functions described in the applicant's DE 102013111974. If the double stroke piston (DHK) 10 is operated via the motor drive, then the brake fluid volume is delivered from the pressure chamber 10b via the valves EA in the braking circuits DK and SK. The valve AS remains open, and the valve VF is open. To monitor the deaeration state of the braking circuits BK, the delivery volume is checked using the pressure in the braking circuits BK via pressure sensor DG. If it does not match the pressure-volume curve, then an EA valve is closed alternately and the further pressure build-up monitored. If a BK failure is identified, the corresponding valve EA remains closed. Simultaneously with the motor operation the isolation valves TV are closed.

If at the end of the forward stroke of the double stroke piston 10 DHK the desired pressure level has not yet been reached, then the return stroke takes place as described in the applicant's application DE 102013111974.3, during which the valve AS is closed and the valve VF is open. If the VF function claimed in application DE 102013111974.3 is required, then during the forward stroke the valve AS and the valve VF are closed. If now the ABS function is required, then for example the pressure regulation takes place according to the prior art with inlet valves EV and exhaust valves AV for pressure reduction (see valve block VB). Here the volume for the pressure reduction reaches the reservoir VB via the return lines R. To reduce the pressure difference at the valve EV it is possible to set the pressure difference at EV for example at only 20% higher than the blocking pressure of what is referred to as the high wheel. Due to the lower pressure difference, with the same maximum pressure gradient the valve cross-section can be selected to be greater, so that during rapid braking the dynamic pressure is lower and what is referred to as the time-to-lock is shorter.

Alternatively, instead of four inlet valves EV and four exhaust valves AV, the MUX pressure controller can be used with four switching valves SV. One of the many advantages is accurate pressure control, because the piston (DHK) sets the appropriate volume in the wheel circuit. This method can also be used here during pressure build-up $P_{auf}$ via valve EV.

During operation to move the brake pedal 12 the redundant pedal travel sensors 2a and 2b are operated in a function to be defined by the OEM, determined by the motor 8 and thus the pressure build-up and the brake booster (BKV). Between the pedal plunger 3 and DK piston a small amount of free travel LW is built-in, so that the pedal initial force is small. This is determined by the restoring forces of the springs, friction in the guides, pedal travel sensors and essentially by the friction of the seals, which are pressure-dependent. This overall friction, acting on the pedal, is conceptually very different. With the S system according to the applicant's DE 102010045617.9 essentially only two seals and the return springs act, and the master cylinder piston with springs only in the fallback level RFE, since as a result of the control signal of the pedal travel sensors in the brake booster (BKV) operation the master cylinder pistons are moved by the pedal plunger. In other systems, for example DE 102012205962, four seals act. In FIG. 4 there are two actuation possibilities, a. and b.

a. Once it has passed through the free travel LW the pedal plunger 3 comes up against the piston 12a and then further acts on the master cylinder return spring 23a and in addition four seals, since the spring 23 is preloaded. So, there is a total of six seals. When the motor starts the valves TVDK and TVSK are closed and an HLF valve opened for return R to the reservoir VB, so that no additional compressive force acts on the piston 12a and pedal plunger 3. Apart from the abovementioned friction the force-travel curve determines just the travel simulator WS, which can also be adaptive as described in the applicant's DE 102014102536.9.

b. Via the opened VDK valve, during the advance stroke of the double stroke piston 10, depending on the motor controller, brake fluid volume from the pressure chamber 10b (also from the pressure chamber 10a via opened valves AS and VF) reaches a pressure chamber 12c delimited by the rear of the DK piston 12a, and thus this acts like the abovementioned S design according to the applicant's DE 102010045617.9, since with the open valve AS only the volume of the front piston contributes to the volume delivery, as also described in the applicant's patent applications DE 102013111974.3 and DE 102014102536.9, to which reference is made here in this connection. Thus, only the frictional force of two seals acts here on the pedal initial force, wherein the pressure components of the small pedal plunger diameter of <15% can be disregarded. In this phase, initially both valves TV are open, advantageously the TVSK is closed once the cross bore 12b of the piston 12a has been passed. This can be identified indirectly via the movement of the DHK piston 10 via the motor sensors. Following closing of TVSK, TVDK remains open, the EADK is closed, and EASK is open, so that the volume of the DHK once TVSK is closed reaches the braking circuit SK. Thus, both BK are at approximately the same pressure level, which at high pressures is no longer the case due to seal friction in the DK piston 12a. For pressure equalisation, here the EADK can be opened, and thus the pressure of the double stroke piston (DHK) 10 acts with the same pressure level in both braking circuits BK. A possible braking circuit failure is diagnosed by one pressure sensor DG in each braking circuit BK and the volume delivery of the double stroke pistons DHK, which must correlate with the pressure-volume curve of the braking circuit BK. If this is not the case, then the volume supply via the respective valve EA is shut down. If there is prefilling intended to balance out the lining clearance or for a rapid increase in pressure, then the valves AS and VF will be closed, so that a large effective piston area of the double stroke piston DHK 10 can be fully operative. Here, with the double stroke piston DHK3, a large piston area comprising the front piston (pressure chamber 10*b*) and the annular piston (pressure chamber 10*a*) acts, which via the piston displacement results in a larger (for example, by a factor of 3) quantity delivered than just with the front piston or its effective surface. With the double stroke piston DHK2 the piston acts with the seal D2. During prefilling, a pressure equalisation on the rear side of the piston is prevented by locking the valve VF according to FIG. 5.

The actuation according to b. has many advantages. For example, the seals of the master cylinder piston are always loaded with real pressure. In systems in which the master cylinder piston is jointly used for the travel simulator WS, only the WS pressure acts here which is approximately only 30% of the brake pressure in the braking circuit BK.

Furthermore, when the travel simulator (WS) actuation point at approximately 40% of the pedal travel is achieved, the valve TVDK is closed together with the WA valve of the travel simulator WS, which is already closed in step 2 of the travel simulator WS. This means that in step 1 of the flat curve the valve WA is open, wherein only the return spring 18 and the seal friction at the auxiliary piston 16 essentially act on the pedal force. In step 2 the valve WA is closed, i.e. the travel simulator piston with its spring characteristic acts on the pedal.

It is known that the pressure in the travel simulator WS can become very high, if a strong driver fully depresses the pedal. Pressures of >300 bar can arise here, stressing the housing and seals. This high pressure is measured with the pressure sensor DG, since the high pedal force acts on the DK piston, if, for example at high pressure of >200 bar the valve WA mechanically opens. In this case the valve VDK can be closed and the valve ESV opened. Thus, both the compressive forces of DK-piston 12*a*, and also of auxiliary piston 16, act on the brake pedal. Thus, the compressive loading is in the range of 200 bar when the valve WA opens. This can be resolved by flow control of the normally open valve.

The pressure reduction in the brake booster (BKV) mode takes place by a return movement of the double stroke piston 10 DHK by additional pressure reduction via AV valves in the return R since the additional volume of VF is not equalised in the return stroke of the double stroke piston DHK.

In the following the fallback levels RFE are now described.

RFE1 in the event of failure of the travel simulator WS, for example due to a leak. In this case the counterforce is lacking, since no pressure develops in the travel simulator WS. It is known that this is identified by the force-travel simulator as described in the applicant's DE 102014102536, to which reference is hereby made, when the progressive increase in force of the travel simulator WS in step 2 after a defined pedal travel (see DE 102014102536) acts or fails. In this case the pedal plunger 3 comes up against the DK piston 12, resulting in a change in pressure measured by the force-travel simulator. In this case the motor actuation and volume control take place on the rear of the DK piston 12*a* via the valve VDK as a function of the KWS signal. In this case the brake booster BKV acts like a conventional brake booster with pedal force support as a follow-up brake booster (Fo-BKV). The advantage here, over the S design, is that with follow-up brake boosting the same short pedal travel acts, but with a somewhat discontinuous curve.

Optimisation of the sensitivity of the force-travel simulator would allow the travel simulator WS to be dispensed with.

RFE 2 with motor failure at low μ, DK piston at travel simulator actuation point with high pedal force and subsequent positive μ-jump. As previously explained in the applicant's DE 102013111974.3, to which reference is made here in this connection, here volume is fed using auxiliary pistons via open valve ESV and EADK into the braking circuit BK by DK piston.

RFE3 with motor and vehicle electrical system failure. The valves ESV, VDK and WA are open here, the valves EADK, EASK are closed. The pedal plunger acts on DK piston 12. The pressure is developed conventionally via the pedal force.

It is also conceivable to construct the S design according to DE 102014102536.9, to which reference is made here, such that the motor is positioned in parallel and via a toothed belt drive, e.g. according to DE 102011050587, acts on the ball screw unit KGT.

FIG. 5 differs from FIG. 2 by the absence of valve HLF, in that only actuation method b. is used, and a double stroke piston (DHK2) 15 with two pistons. Furthermore, by dispensing with VF this valve can be omitted. In FIG. 5 this valve is shown for the function VF and is, however, unlike in FIG. 4 positioned between valve AS and the double stroke piston 15.

This double stroke piston DHK2 or also DHK3 according to FIG. 4 can also be used in a P design according to DE 10 2012 222 897 A1.

In hydraulic systems, it must be ensured that these are pressure balanced when the vehicle is at a standstill. This is the case with the system according to FIG. 4 and FIG. 5, since all valves (AS, VF, VDK, ESV, WA) for the return flow and also the cross bores of the master cylinder piston are open.

There are two advantages that differentiate double stroke piston (DHK3) according to FIG. 4 with three pistons from the double stroke piston (DHK 2) according to FIG. 5. The double stroke piston DHK3 can develop a depression in the pressure chamber 10*b*, if the D1 seal is depression-proof. This is an advantage when setting the lining clearance of the brake pistons with depression as described in the applicant's DE 10 2008 051 316.4, to which in this respect reference is made here. The second advantage is the reliability in the event of failure of the seals D1-D3. If one of the three seals fails, then pressure can be developed in the advance stroke, and the BKV function is maintained. Furthermore, the failure is diagnosed. This is important for autonomous driving/braking, since in the event of single faults the function must be retained.

FIG. 5*a*, with the double stroke piston DHK, shows a simplification of the 2-piston version. Here the isolation valve AS is dispensed with, with two pressure relief valves V1 and V2 being used. The plunger 4 acts via seal D3 directly on the piston. When the return stroke is not used for further volume delivery in the braking circuit, with the intention instead being pressure reduction upon retraction of the brake pedal, this can take place by opening the ABS-AV valve or by an additional AVX valve in the double stroke piston DHK circuit.

FIG. 6 shows a vehicle brake or an actuating system for this, with first, second and third piston-cylinder units arranged one behind the other in a row.

In parallel, e.g. with a spatially displaced central axis, in the area of the first piston-cylinder unit (double-stroke piston) a drive with electric motor 8 is arranged, wherein the propulsion takes place from the drive spindle to a surrounding nut and from this to the spindle 5 of a ball screw unit 7 by means of a toothed belt. The other elements of the actuator system correspond extensively to those shown in FIGS. 4 and 5, so that a more detailed description can be dispensed with here. A parallel arrangement of the motor with belt drive can also be advantageous apart from that in a P arrangement of the actuating system shown in FIGS. 4 and 5.

Figure 7:
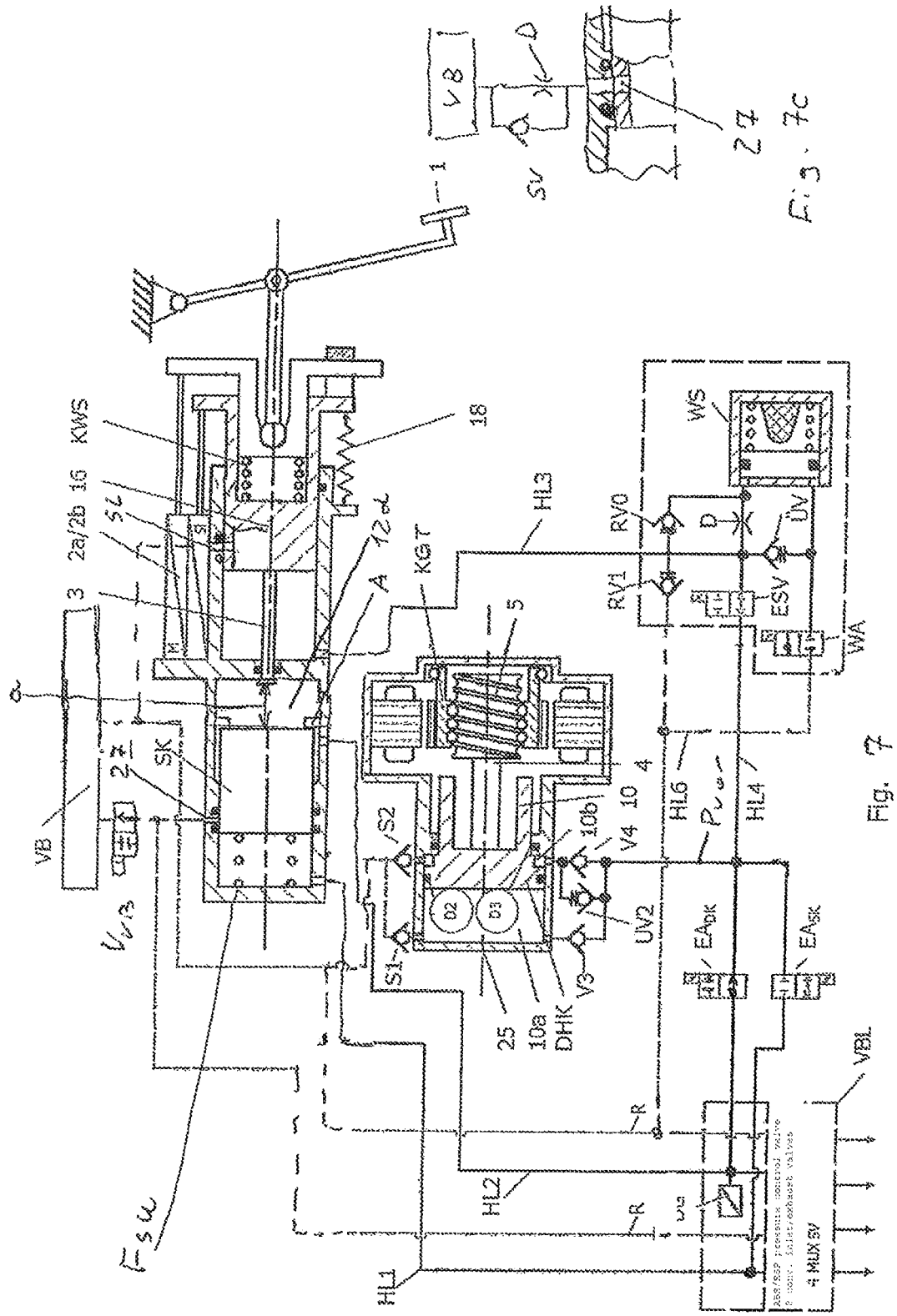
FIG. 7 a particularly simple implementation (minimal version) of the system with additional installed length reduction.

FIG. 7 shows a particularly simple implementation of the invention with considerable further reduction in installed length in which the (second) piston-cylinder unit DHK (double stroke piston) driven by the electric motor is implemented as in FIG. 2. Here, however, the first piston cylinder unit DHK (master cylinder) arranged in parallel to the driven piston-cylinder unit has only one piston SK, the first working chamber of which, provided with a spring $F_{SK}$, is connected via a line HL1 and via the valve block VBL with corresponding wheel brakes and forms a firstbraking circuit. In other words, a further piston DK (as is present in the implementation according to FIG. 2) is not provided here. A further working chamber 12d formed on the rear of the floating piston SK of the piston cylinder unit (master cylinder) is connected via a line HL2 and the valve block VBL with corresponding wheel brakes and forms a second braking circuit. The working chamber 12d expediently has at an appropriate point a vent (not shown), for example by means of a mechanical vent screw or a normally closed solenoid valve. Here the first piston-cylinder unit (master cylinder) has a stop A for the piston SK, which the piston SK can come up against by means of the piston spring $F_{SK}$. In this way, free travel a between the piston SK and the pedal plunger 3 arranged on the auxiliary piston 16 is set up. The gap or free travel a corresponds here preferably to half the stroke of the pedal plunger 3, e.g. 36/2 mm. It can also be smaller, however, wherein the minimum corresponds to the stroke until the stop of the travel simulator WS. In the lines to the hydraulic lines or braking circuits HL1 or HL2, with regard to braking circuit HL1, a normally closed valve $EA_{SK}$ is used and with regard to braking circuit HL2, a normally open valve $EA_{DK}$ is used. Since otherwise the implementation according to FIG. 7 largely corresponds to that of FIG. 2, reference thereto is also made, so that here a more detailed description can be dispensed with and only the differences concerning implementation and function are described.

A third piston-cylinder unit (auxiliary piston) is arranged in series with the first piston-cylinder unit (master cylinder) and has a plunger (pedal plunger 3) arranged on the auxiliary piston 16, the end of which can act on the piston SK.

The working chamber of the piston-cylinder unit (auxiliary piston) is connected via a hydraulic line HL3, a travel simulator arrangement and a hydraulic line HL4 with the braking circuits and the second piston-cylinder unit DHK.

The travel simulator arrangement largely corresponds to that shown in FIG. 2 wherein, however, in the implementation according to FIG. 7 a normally closed valve WA is used.

When the double stroke piston DHK is operated here from the working chamber 10a via valve EA, hydraulic fluid is delivered directly into the associated braking circuit or the pressure correspondingly raised.

In the fallback level RFE, by means of the auxiliary piston 16 from the working chamber of which, via line HL3, HL4 and the normally open valve ESV, hydraulic fluid can be delivered into the braking circuits or the pressure correspondingly raised, wherein the valve WA is normally closed. In other words, here the auxiliary piston 16 performs the function of the piston DK in the implementation according to FIG. 2. Here the hydraulic fluid volume from the working chamber of the auxiliary piston 16 reaches, via the normally open valve $EA_{DK}$ and the normally open valve ESV, the line HL2 or the corresponding braking circuit.

Figure 7B:
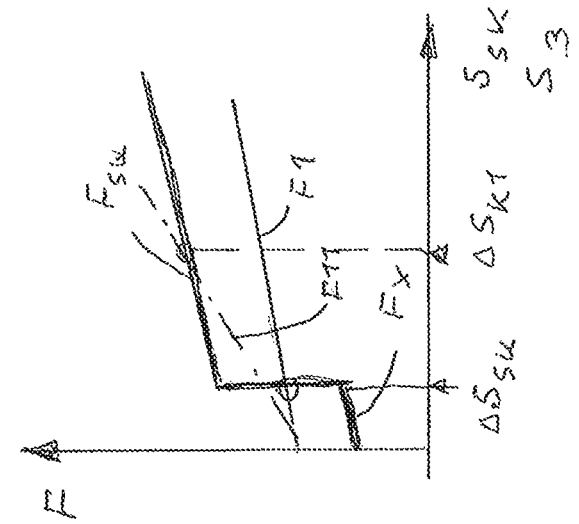
FIG. 7b spring characteristics.
Figure 7A:
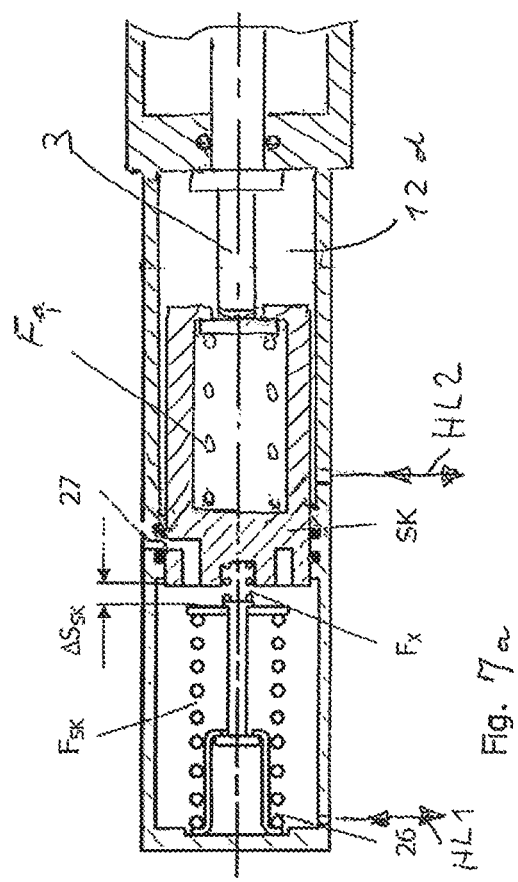
FIG. 7a a spring arrangement.

In the implementation according to FIG. 1 or 1a, a two-step spring is provided on the floating piston SK. A corresponding spring can also be provided in the implementation according to FIG. 7, and is shown enlarged in FIG. 7a. The spring power $F_{SK}$ of this spring does not have to be highly progressive, since a plunger rod piston DK and thus also in this simplest of implementations a spring for this is not present here. The spring provided for on the plunger rod piston in the implementation according to FIG. 1, is unnecessary here or can be replaced by a combined spring arrangement, which is supported on the pedal plunger 3, as shown in FIG. 7a.

Alternatively, on the third piston-cylinder unit (auxiliary piston 16) a cross bore SL can be provided. As a result, a pressure equalisation advantageously takes place between the double stroke piston DHK and the auxiliary piston 16 and furthermore a reliable deaeration of the auxiliary piston. A pressure equalisation via the cross bore SL can also be dispensed with. Here the volume expansion of the travel simulator WS is absorbed and can, for example when the vehicle starts up, be equalised by briefly opening the valve $EA_{SK}$ or the valve AV via the return to the reservoir. Volume equalisation can also take place by combining the valve RV1 with a choke, allowing a small leakage flow, since the temporal change as the temperature rises is small.

Since the piston DK is missing from the implementation according to FIG. 7, the supply of additional volume by parallel connection of the auxiliary piston and piston DK is not possible in the implementation according to FIG. 7. All other functions of the other embodiments shown in FIGS. 1-6 are possible with the implementation according to FIG. 7, however, in particular: follow-up brake boosting, reduction of the pressure level in the auxiliary piston circuit by lowering the pressure level in the braking circuit HL2 and full pressure level in the braking circuit of the floating piston SK, diagnostics, prefilling, adaptive travel simulation, no failure of the brake boosting if the braking circuits HL1 and HL2 fail through diagnosis of the braking circuit failure and blocking of the valve EA.

In the implementation according to FIG. 7 the pressure build-up takes place upon braking from the working chamber 10a of the second piston-cylinder unit (double stroke piston DHK) via the valve $EA_{DK}$ in the braking circuit HL2 and via the working chamber of the piston SK of the first piston-cylinder unit (master cylinder) in the braking circuit HL1. Here the valve ESV is closed and the valve WA is opened, depending on the working range of the travel simulator WS. In step 1 of the travel simulator WS the valve WA is open, wherein only the return spring 18 of the auxiliary piston 16 determines the pedal force.

In the ABS mode, the valve ESV is closed and the valve may similarly be closed, depending on the working range of the travel simulator WS. Pressure medium is supplied to the braking circuits HL1 and H12 from the working chamber 10a of the double stroke pistons DHK, so that due to the open valves EA a pressure equilibrium is present at the piston SK. The positions of the piston SK are determined by the springs $F_{SK}$ and F1, as shown and described in this respect in FIGS. 7a and 7b.

In the fallback level 1 (failure of the travel simulator arrangement) the system operates as a follow-up brake booster. Once the pedal has gone through its travel the pedal plunger 3 comes up against the floating piston SK. In this area, the increase in pedal force is relatively flat. In this area, however, a prefilling already takes place via the valve ÜV2, so that once the pedal plunger 3 comes up against the piston SK a smaller pedal travel is necessary for the pressure increase. Once the pedal plunger 3 has come up against the piston SK, the admission pressure of the double stroke piston DHK is controlled via the valve $EA_{DK}$ by means of the force-travel simulator provided on the auxiliary piston 16 such that a desired pedal force or a desired brake pressure develops in the braking circuits HL1 and HL2.

In the fallback level 2/2a the volume displaced from the working chamber of the auxiliary piston 16 acts via valves ESV and EA in the braking circuits HL1 and HL2, wherein an unsymmetrical pressure build-up may result, depending on the position of the piston SK. This can be avoided by a pressure equalisation via open valves EA. Here the piston SK can be in the starting or end position and the pedal plunger 3 coming up against the piston SK then causes an unsymmetrical pressure level in the braking circuits HL1 and HL2.

In the fallback level 3 the volume from the working chamber of the auxiliary piston 16 acts fully on the braking circuit HL2 and the volume from the working chamber of the floating piston correspondingly on the braking circuit HL1. In this way, the auxiliary piston 16 acts like a plunger rod piston DK (e.g. the implementation according to FIG. 2). The volume of auxiliary piston 16 fed in is reduced by the volume uptake of the travel simulator WS (approx. 20%). This can be avoided if necessary by an isolation valve (not shown) for the travel simulator WS. By suitable dimensioning of the auxiliary piston 16 the delivery volume in the fallback level RFE can be increased with a corresponding dimensioning of the travel simulator piston and the travel simulator springs.

By using an extended valve function as shown in FIG. 3 with valves AS and VF and $AV_{MUX}$, here also the various additional functions described such as defined advance and return stroke, pressure reduction in double stroke piston DHK, prefilling and multiplexing (MUX), can be implemented with relatively little additional cost. It is also possible to use the double stroke piston with three pistons (or three effective piston surfaces) according to FIG. 4, in order for example to achieve a specific depression for controlling the lining clearance. In this system, the double stroke piston DHK acts to develop pressure (and modulation in the multiplex procedure MUX) in the braking circuits. The auxiliary piston 16 acts together with the travel simulator piston as a travel simulator and determines the pedal characteristic. If the double stroke piston DHK or the motor fails (fallback level), the auxiliary piston 16 steps in and acts like a plunger rod piston DK and supplies one braking circuit directly or via the piston SK, in which the volume or pressure of the auxiliary piston 16 acts on the secondary side of the piston SK, both braking circuits, with pressure medium. Due to this dual function of the auxiliary piston 16 not only is there a reduction in costs, but also an even simpler implementation of the many functions according to the invention.

A pressure reduction from the braking circuits HL1 and HL2 takes place in a first step (as far as travel simulator step 1) via the valve ESV and WA in the reservoir VB and from the second step (travel simulator step 2) via the valves EA and IV from braking circuit HL2 in the reservoir VB.

FIG. 7a shows in enlarged detail the piston SK with the pedal plunger 3. The piston SK is fixed in its starting position with springs. The intention here is that when the pedal plunger 3 is operated the piston SK is moved via the cross bore 27, so that in this position in both braking circuit HL1 and HL2 pressure can be fed in. This is achieved by the spring force F1 as Fx; see also FIG. 7b. Following a stroke of $\Delta S_{sk}$, during which the poppet valve 27 is securely closed, the preloaded spring F then acts. If now volume or pressure is fed from the double stroke piston DHK into the pressure chamber 12d, then the piston SK moves accordingly. If now the piston SK for the sake of sufficient volume in the fallback levels is intended to be moved back into the starting position $\Delta S_{sk}$, then this takes place at the same pressure on both sides of the piston SK due to the higher spring force of the spring $F_{SK}$. Due to the progressive design of the spring, e.g. according to the curve F11 in FIG. 7b, this position can be changed to another value $\Delta S_{sk}$.

FIG. 7c shows an alternative to the valve $V_{VB}$ in the connection of cross bore 27 of the piston SK to the reservoir VB. This valve is needed so that in the rare event of the secondary sleeve of the piston SK failing, the pressure supply from the double stroke piston DHK does not fail as well. In this case the double stroke piston DHK would be delivering volume in chamber 12a without an increase in pressure if there is a major leak. This case is identified by the diagnostics by comparing the volume delivery with the pressure, leading to closure of the valve $V_{VB}$. This can be solved at low cost according to FIG. 7c, by using a choke D and a suction valve in the connecting line. The cross-section of the choke D is very small, since it is used only for volume equalisation with increasing temperature, so that the volume from the braking circuit HL1 can flow back into the reservoir VB. Due to the choke, the volume delivery of the double stroke piston DHK is significantly greater than the leakage volume, such that sufficient pressure develops. The suction valve SV is used for deaerating the braking circuit HL1. The valve $EA_{DK}$ has the task, in the event of a leak in the braking circuit HL2, between chamber 12d and the valve block VBL or in the double stroke piston DHK, of isolating the braking circuit HL2 by closing EA. Since this can be excluded from the design, the valve $EA_{DK}$ can also be dispensed with. The pressure sensor DG can also be replaced by measurement of the motor current, which behaves approximately proportionally to the pressure. The valve EASK is necessary for pressure equilibrium between the braking circuits HL1 and HL2 for the described piston positioning of the piston SK and also in order, in the event of a leak in the braking circuit HL1 as a whole, to isolate this.

With these simplifications, reliable diagnostics are of major importance, to reliably detect leaks in time. This essentially takes place by comparing the volume delivery of the double stroke piston DHK with the pressure level reached, which is determined directly by means of pressure sensor DG or indirectly by means of motor current measurement. The volume and pressure are compared here with the vehicle-specific pressure-volume curve. This can take place in any operating mode with the due validity, i.e. comparison with one or two braking circuits. In the event of invalidity or a leak, a corresponding switching of valve or motor takes place, usually an isolation of a braking circuit. The corresponding braking circuits are then no longer supplied by the piston-cylinder unit (double stroke piston). The volume of the double stroke piston is measured, for example, via the motor or the rotation angle of the rotor, which drives the spindle 5 and thus the double stroke piston DHK.

LIST OF REFERENCE NUMERALS

1 Brake pedal
2a Pedal travel sensors Master

2b Pedal travel sensors Slave
3 Pedal plunger
4 Piston plunger
5 Spindle
6 Motorsensor
7 KGT
8 EC-motor
9 Bearing
10 Double stroke piston (DHK3)
10a Working chamber (annular chamber) or pressure chamber
10b Working chamber or pressure chamber
10c working chamber or pressure chamber
11 Reservoir
12 SK piston
12a DK piston
12b Cross boreDK
12c Working or pressure chamber
15 Double stroke piston (DHK2)
16 Auxiliary piston
18 Pedal return spring
23 Master cylinder return spring
23a Master cylinder return spring
24 Isolation valve
25 DHK housing
26 Spring housing
27 Cross bore
A Stop
D Choke aperture
S1 Suction valve 1
S2 Suction valve 2
S5 Suction valve 5
V3 Pressure relief valve
V4 Pressure relief valve
$V_{VB}$ Solenoid valve
R Return to reservoir VB
RV0 Non-return valve 0
RV1 Non-return valve 1
WS Travel simulator
WA Solenoid valve
ÛV Pressure relief valve
ÛV2 Prefill pressure relief valve
HiKo Auxiliary piston
HL1 Hydraulic line or braking circuit
HL2 Hydraulic line or braking circuit
LW Free travel
RFE Fallback level
LS Clearance
KWS Force-travel sensor
BK Braking circuit
DG Pressure sensor
VF Prefilling
BKV Brake servo
Fo-BKV Follow-up BKV
VB Reservoir
VBL Valve block
$F_{SK}$ Return spring SK
$F_X$ Supplementary spring
AV Exhaust valve ABS
EV Inlet valve ABS
$P_{vor}$ Admission pressure from DHK
FoDK Supplementary spring on piston DK
VVB Valve to reservoir VB
FPS First pressure source
SPS Second pressure source
FPCU First piston-cylinder unit
SPCU Second piston-cylinder unit

What is claimed is:

1. An actuating device for a vehicle brake, comprising:
an actuating arrangement;
at least one first pressure source arranged to be actuated using the actuating arrangement;
a second pressure source having two pressure chambers and having an electromechanical drive, wherein the second pressure source is connected via a hydraulic line to at least one braking circuit to enable pressure medium to be supplied to the braking circuit and to thereby apply pressure to the vehicle brake; and
a valve arrangement arranged to regulate brake pressure,
wherein the second pressure source includes a double-stroke piston, and wherein the second pressure source is arranged to supply pressure medium to the at least one braking circuit in a controlled manner during both forward and return piston strokes of the double-stroke piston, and
wherein the two pressure chambers of the second pressure source are connected by an interconnecting hydraulic line, in which exactly two solenoid valves are arranged in series.

2. The actuating device according to claim 1, wherein the exactly two solenoid valves are arranged to control pressure medium supply and pressure medium return.

3. The actuating device according to claim 1, wherein the interconnecting hydraulic line is connected to the at least one braking circuit.

4. The actuating device according to claim 1, wherein the double-stroke piston is arranged between the two pressure chambers, and wherein the two pressure chambers of the second pressure source have different respective effective piston surfaces.

5. The actuating device according to claim 1, wherein the interconnecting hydraulic line is arranged for prefilling the at least one braking circuit from a pressure chamber of the two pressure chambers of the second pressure source.

6. The actuating device according to claim 1, wherein pressure reduction is enabled by returning pressure medium from the at least one braking circuit into the second pressure source.

7. The actuating device according to claim 1, wherein the second pressure source comprises a piston-cylinder unit including the double-stroke piston, and wherein the piston-cylinder unit is enabled to generate a depression by configuring the seals and/or valve switching for setting a lining clearance.

8. The actuating device according to claim 1, wherein, in a case in which a vehicle including the vehicle brake is idle, the hydraulic systems and lines or pressure chambers are pressure-balanced by means of open valves for return of pressure medium to a reservoir.

9. The actuating system according to claim 1, wherein, in a fallback level corresponding to a failure of pressure supply, pressure medium is enabled to be supplied to the at least one braking circuit by means of the actuating arrangement.

10. The actuating device according to claim 1, wherein each pressure chamber of the second pressure source is connected to the reservoir via a non-return valve opening towards the second pressure source.

11. The actuating device according to claim 1, further comprising a diagnostic circuit configured to test seals of the at least one first pressure source and/or of the second pressure source.

12. The actuating device according to claim 1, further comprising a travel simulator arrangement.

13. A method of operating a braking system including the actuating device according to claim 1, the method comprising:
supplying pressure medium to the at least one braking circuit in a controlled manner during both forward and return piston strokes of the double-stroke piston; and
diagnosing at least one leak or presence of air in the at least one braking circuit, said diagnosing including performing at least one pressure-related correlation with at least one pressure-volume characteristic curve corresponding to the at least one braking circuit or to one or more individual wheel brakes of the at least one braking circuit, wherein the at least one pressure-related correlation is based at least in part on a delivery volume of the second pressure source based upon effective piston surface and piston displacement of a double-stroke piston included in the second pressure source.

14. The method of operating a braking system according to claim 13, further comprising using the pressure-volume characteristic curve corresponding to a respective wheel brake of the one or more individual wheel brakes to determine a delivery volume of the second pressure source to be used for pressure build-up or pressure reduction, via a respective inlet valve or exhaust valve.

15. The method of operating a braking system according to claim 13, further comprising setting a lining clearance by generating a depression using the second pressure source.

16. The method of operating a braking system according to claim 13, further comprising using at least one solenoid valve to control different operating modes of the braking system.

17. The method of operating a braking system according to claim 13, further comprising:
supplying pressure medium to a path simulator using the actuating arrangement; and
supplying pressure medium to the at least one braking circuit in a fallback level corresponding to failure of pressure supply.

18. The method of operating a braking system according to claim 13, further comprising performing one or more functional diagnostics, wherein a comparison is performed between a delivery volume of the second pressure source and a pressure level achieved at the time of the one or more functional diagnostics.

19. The actuating device according to claim 1, further comprising first and second hydraulic lines connecting the at least one first pressure source and the second pressure source with the valve arrangement; and
a pressure sensor arranged in one of the first or second hydraulic lines.

20. The actuating device according to claim 1, wherein the first pressure source comprises a first piston-cylinder unit including a plunger rod piston and a floating piston, and wherein a return spring and a supplemental spring are arranged to apply force to the floating piston in a direction toward the plunger rod piston.

21. The actuating device according to claim 1, wherein the first pressure source comprises a first piston-cylinder unit including a plunger rod piston and a floating piston, wherein the plunger rod piston has only one seal, and wherein the plunger rod piston and the floating piston are coupled together via a spring housing of the plunger rod piston.

* * * * *